United States Patent [19]
Ellersick et al.

[11] Patent Number: 6,044,122
[45] Date of Patent: Mar. 28, 2000

[54] DIGITAL PHASE ACQUISITION WITH DELAY LOCKED LOOP

[75] Inventors: William F. Ellersick, Redwood City; William L. Geller, Foster City; Paulmer M. Soderberg, Palo Alto, all of Calif.

[73] Assignee: Ericsson, Inc., Menlo Park, Calif.

[21] Appl. No.: 08/787,849

[22] Filed: Jan. 23, 1997

[51] Int. Cl.$^7$ ........................................ H04L 7/02
[52] U.S. Cl. ..................... 375/360; 375/376; 327/9; 327/12; 327/149; 327/158; 327/159; 327/160; 327/161
[58] Field of Search ..................... 375/354, 355, 375/359, 360, 371, 373, 376; 327/141, 144, 146, 147, 149, 150, 152, 153, 158–163, 9, 12

[56] References Cited

U.S. PATENT DOCUMENTS

| | | | |
|---|---|---|---|
| 4,189,622 | 2/1980 | Foshee | 178/69.1 |
| 4,819,251 | 4/1989 | Nelson | 375/119 |
| 4,959,846 | 9/1990 | Apple et al. | 375/118 |
| 4,975,929 | 12/1990 | Apple et al. | 375/119 |
| 5,040,193 | 8/1991 | Leonowich et al. | 375/87 |
| 5,144,669 | 9/1992 | Faulkner et al. | 380/49 |
| 5,235,622 | 8/1993 | Yoshida | 375/106 |
| 5,241,409 | 8/1993 | Hill et al. | 359/128 |
| 5,341,365 | 8/1994 | Clarke | 370/17 |
| 5,444,710 | 8/1995 | Fisher et al. | 370/95.3 |
| 5,452,324 | 9/1995 | Lewis et al. | 375/373 |
| 5,485,300 | 1/1996 | Daley | 359/180 |
| 5,488,641 | 1/1996 | Ozkan | 375/374 |
| 5,491,729 | 2/1996 | Co et al. | 375/376 |
| 5,642,386 | 6/1997 | Rocco, Jr. | 375/355 |
| 5,671,258 | 9/1997 | Burns et al. | 375/359 |
| 5,719,515 | 2/1998 | Danger | 327/270 |
| 5,761,254 | 6/1998 | Behrin | 375/355 |

FOREIGN PATENT DOCUMENTS

| | | | |
|---|---|---|---|
| 0 480 165 A2 | 4/1992 | European Pat. Off. | H04L 7/033 |
| 0 639 004 A1 | 2/1995 | European Pat. Off. | H03K 5/135 |
| 0 705 003 A2 | 4/1996 | European Pat. Off. | H04L 7/033 |

*Primary Examiner*—Amanda T. Le
*Attorney, Agent, or Firm*—Lyon & Lyon LLP

[57] ABSTRACT

A digital phase acquisition clock recovery circuit includes a digital phase-locked loop that employs a truth table decoder to set the actual delay through a plurality of individual delay elements to generate a plurality of clock phase signals approximately equally spaced in time over one reference clock cycle, and a data sampler circuit that generates a plurality of received data samples from an incoming data sample taken at the rising edge of the respective clock phase signals and synchronizes the data samples to reference clock on a bit period-by-bit period basis. A digital phase acquisition circuit includes an edge detector which evaluates the data samples over each bit period to detect the location of a transition between respective adjacent samples, wherein logic is employed to continually determine the "relative quality" of each data sample, based upon its sampling time being furthest from a detected edge transition. The data sample phase associated with the highest relative quality value integrated over time is then used to recover the incoming (i.e., optimally phased) data signal.

24 Claims, 10 Drawing Sheets

| COUNTER OUTPUT | OUTPUT WORDS (8 X 7 BITS) | | | | | | | |
|---|---|---|---|---|---|---|---|---|
| 100 | 104h | 104g | 104f | 104e | 104d | 104c | 104b | 104a |
| 0 | 01 | 01 | 01 | 01 | 01 | 01 | 01 | 01 |
| 1 | 01 | 01 | 01 | 01 | 01 | 01 | 01 | 02 |
| 2 | 01 | 01 | 01 | 02 | 01 | 01 | 01 | 02 |
| 3 | 01 | 01 | 01 | 02 | 01 | 02 | 01 | 02 |
| 4 | 01 | 02 | 01 | 02 | 01 | 02 | 01 | 02 |
| 5 | 01 | 02 | 01 | 02 | 01 | 02 | 02 | 02 |
| 6 | 01 | 02 | 02 | 02 | 01 | 02 | 02 | 02 |
| 7 | 01 | 02 | 02 | 02 | 02 | 02 | 02 | 02 |
| 8 | 02 | 02 | 02 | 02 | 02 | 02 | 02 | 02 |
| 9 | 02 | 02 | 02 | 02 | 02 | 02 | 02 | 04 |
| a | 02 | 02 | 02 | 04 | 02 | 02 | 02 | 04 |
| b | 02 | 02 | 02 | 04 | 02 | 04 | 02 | 04 |
| c | 02 | 04 | 02 | 04 | 02 | 04 | 02 | 04 |
| d | 02 | 04 | 02 | 04 | 02 | 04 | 04 | 04 |
| e | 02 | 04 | 04 | 04 | 02 | 04 | 04 | 04 |
| f | 02 | 04 | 04 | 04 | 04 | 04 | 04 | 04 |
| 10 | 04 | 04 | 04 | 04 | 04 | 04 | 04 | 04 |
| 11 | 04 | 04 | 04 | 04 | 04 | 04 | 04 | 08 |
| 12 | 04 | 04 | 04 | 08 | 04 | 04 | 04 | 08 |
| 13 | 04 | 04 | 04 | 08 | 04 | 08 | 04 | 08 |
| 14 | 04 | 08 | 04 | 08 | 04 | 08 | 04 | 08 |
| 15 | 04 | 08 | 04 | 08 | 04 | 08 | 08 | 08 |
| 16 | 04 | 08 | 08 | 08 | 04 | 08 | 08 | 08 |
| 17 | 04 | 08 | 08 | 08 | 08 | 08 | 08 | 08 |
| 18 | 08 | 08 | 08 | 08 | 08 | 08 | 08 | 08 |
| 19 | 08 | 08 | 08 | 08 | 08 | 08 | 08 | 10 |
| 1a | 08 | 08 | 08 | 10 | 08 | 08 | 08 | 10 |
| 1b | 08 | 08 | 08 | 10 | 08 | 10 | 08 | 10 |
| 1c | 08 | 10 | 08 | 10 | 08 | 10 | 08 | 10 |
| 1d | 08 | 10 | 08 | 10 | 08 | 10 | 10 | 10 |
| 1e | 08 | 10 | 10 | 10 | 08 | 10 | 10 | 10 |
| 1f | 08 | 10 | 10 | 10 | 10 | 10 | 10 | 10 |
| 20 | 10 | 10 | 10 | 10 | 10 | 10 | 10 | 10 |
| 21 | 10 | 10 | 10 | 10 | 10 | 10 | 10 | 20 |
| 22 | 10 | 10 | 10 | 20 | 10 | 10 | 10 | 20 |
| 23 | 10 | 10 | 10 | 20 | 10 | 20 | 10 | 20 |
| 24 | 10 | 20 | 10 | 20 | 10 | 20 | 10 | 20 |
| 25 | 10 | 20 | 10 | 20 | 10 | 20 | 20 | 20 |
| 26 | 10 | 20 | 20 | 20 | 10 | 20 | 20 | 20 |
| 27 | 10 | 20 | 20 | 20 | 20 | 20 | 20 | 20 |
| 28 | 20 | 20 | 20 | 20 | 20 | 20 | 20 | 20 |
| 29 | 20 | 20 | 20 | 20 | 20 | 20 | 20 | 40 |
| 2a | 20 | 20 | 20 | 40 | 20 | 20 | 20 | 40 |
| 2b | 20 | 20 | 20 | 40 | 20 | 40 | 20 | 40 |
| 2c | 20 | 40 | 20 | 40 | 20 | 40 | 20 | 40 |
| 2d | 20 | 40 | 20 | 40 | 20 | 40 | 40 | 40 |
| 2e | 20 | 40 | 40 | 40 | 20 | 40 | 40 | 40 |
| 2f | 20 | 40 | 40 | 40 | 40 | 40 | 40 | 40 |

NOTE: ALL VALUES IN HEXADECIMAL

*FIG. 7*

|  | l | m | n | q |
|---|---|---|---|---|
| | ↓ | ↓ | ↓ | ↓ |
| Rx SMPLS (45a-h) | h a b c d e f g h | a b c d e f g h | a b c d e f g h |
| | 0 0 0 1 1 1 1 1 1 | 1 1 0 0 0 0 0 0 | 0 0 1 1 1 1 1 1 |
| Rx EDGES (133a-h) | 131 ↘ 0 0 1 0 0 0 0 0 | 0 0 1 0 0 0 0 0 | 0 0 1 0 0 0 0 0 |
| RQINC (136a-h) | 0 0 0 1 1 1 0 0 | 0 0 0 1 1 1 0 0 | 0 0 0 1 1 1 0 0 |
| RQDEC (138a-h) | 1 1 0 0 0 0 0 1 | 1 1 0 0 0 0 0 1 | 1 1 0 0 0 0 0 1 |
| | 137 ↘ | 139 ↘ | |
| CTR VALUES (140a-h) | +1 −1 +1 −1 −1 +1 −1 +1 | −1 −2 +1 +1 +2 +1 −1 −2 | −2 −2 +1 +2 +2 +2 −1 −2 |
| QUAL SIGN (142a-h) | 0 1 0 1 1 0 1 0 | 1 1 0 0 0 0 1 1 | 1 1 0 0 0 0 1 1 |
| BEST PHASE (148a-h) | 0 0 1 0 0 0 0 0 | 0 0 0 0 0 1 0 0 | 0 0 0 0 0 1 0 0 |

*FIG. 10*

DIGITAL PHASE ACQUISITION WITH DELAY LOCKED LOOP

FIELD OF THE INVENTION

The present invention pertains to the field of communication networks and, more particularly, to methods and apparatus for clock recovery in optical networks.

BACKGROUND

In most modern telecommunication networks, a community of subscribers are connected to a central office switch through a two-way distribution network, which may include one or more transmission facilities, e.g., microwave, optical, electrical, etc., and which may utilize both digital baseband and analog transmission protocols. In particular, between the central office switch and each subscriber network unit, telecommunication signals may be digitized and multiplexed for transport over relatively high bandwidth facilities, e.g., optical fiber, for greater network efficiency.

In an exemplary optical communication network, an optical line terminal ("OLT") located at a central office transmits and receives digital telecommunications data to and from a number of remotely located optical network units ("ONUs"). Data is optically transported between the OLT and the respective ONUs in the form of pulses of light. In the downstream direction, the OLT cross-connects downstream data contained in "switch" channels into "fiber" channels for optical transmission to respective ONUs. The ONUs convert the received channel light pulses into electrical signals, which are de-multiplexed and terminated on respective subscriber "line cards," which generally perform functions such as digital-to-analog conversion and power regulation, e.g., for dial tone, ringing, off-hook detection, etc., that are traditionally performed at the central office. The respective subscriber line cards are connected to individual subscriber lines, e.g., twisted wire pairs, for transport of the subscriber signals to and from respective subscriber premise locations. In the upstream direction, the OLT converts received light pulses into electrical digital data signals, and cross connects the incoming data contained in fiber channels transmitted from the respective ONUs into switch channels.

Various communication protocols may be used to support the transport of the optical signals between the OLT and the respective ONUs. For example, in an exemplary passive optical network system, the data is transmitted in successive time division multiplexed ("TDM") optical packets, or cells, wherein the data within each packet is time-division multiplexed. In order to accurately receive the incoming data packets, the OLT or respective ONU samples the incoming data signal to interpret the respective ones and zeros. This, in turn, requires that the respective OLT and ONUs be able to synchronize their sampling circuitry to the received signal, in order to correctly interpret the incoming pulses.

More particularly, in the downstream direction, a single, continuous optical data signal from the OLT is transmitted to the ONUs—i.e., wherein all ONUs receive the same downstream signal. A data sampling clock can be acquired at a respective ONU with a conventional analog clock recovery phase-locked loop circuit. However, analog clock recovery is relatively slow, with many clock cycles elapsing before the signal phase is acquired.

In particular, an analog phase-locked loop clock recovery circuit does not work well in the upstream direction, where multiple ONUs transmit differing signals on a shared upstream fiber and an accurate sampling clock at the OLT must be rapidly determined, i.e., preferably by using only a few data transitions at the beginning of each incoming packet. Further, because different signals can traverse widely varying lengths of optical fiber cable (i.e., depending on which ONU they were transmitted from), the time-of-flight transmission difference between respective ONUs results in a relative phase shift between received signals at the OLT. Coupled with the rapid frame rate used in telecommunication systems—125 microseconds per frame is standard—the phase shift between signals transmitted from multiple ONUs renders the use of a conventional analog phase-locked-loop clock recovery infeasible for the upstream receiver at the OLT. Thus, a digital phase acquisition circuit is preferred for receiving and recovering upstream data transmissions at the OLT.

Conventional digital clock recovery circuits acquire phase by means of a high-frequency clock that generates multiple phases of the clock signal. An initial phase is selected, and a control loop is run to change the data phases on an incremental basis until the optimal phase is reached. However, such clock recovery devices, while not as slow as analog clock recovery circuits, still require a relatively large number of bit times of received data before the incoming signal phase can be accurately acquired. Moreover, conventional digital clock recovery circuits are relatively expensive as they rely on high-speed digital clocks, which must be several times faster than the signal bit rate used for the clock recovery function. As the bit rate of systems increase, clock recovery circuits that rely on clocks that operate on several times the bit rate become impractical. For example, eight phases of 61 megabits per second (mbps) would require a clock speed of 488 MHz.

Thus, there is a need for a digital clock recovery device that can rapidly acquire the phase of respective incoming signals, yet can be deployed at a relatively low cost.

SUMMARY OF THE INVENTION

The present invention provides methods and apparatus for rapidly acquiring digital data and signal phase of an incoming data signal, e.g., in conjunction with an optical receiver employed in a passive optical network system.

In a preferred embodiment, a digital clock recovery circuit, which may be implemented in an optical data receiver as part of an application specific integrated circuit ("ASIC"), includes a multi-phase, digital delay-locked loop, which receives a digital reference clock at the incoming data signal bit rate as an input and generates a plurality of clock phase signals as an output, wherein the respective clock phase signals are approximately equally spaced in time over one clock cycle of the reference clock. More particularly, the delay-locked loop employs a plurality of successively connected, individually adjustable delay circuits to generate a corresponding number of delayed clock phase signals, wherein the specific delay through each delay circuit is determined by a selectable path through a plurality of successive internal buffer elements. A feedback loop including a state machine decoder is used to periodically adjust the actual delay period through each of the respective individual delay circuits to account for changes or variances due to, e.g., temperature drift, manufacturing process, supply voltage fluctuations, etc.

A received data sampler circuit receives both the plurality of clock phase signals and the incoming data signal as inputs, and generates a plurality of samples of the received data on a bit period-by-bit period basis as an output, wherein the data samples are taken at the rising edge of the respective clock phase signals and then synchronized to the reference clock, e.g., by employing a plurality of digital flip-flops. The data samples are processed by a digital phase acquisition circuit, wherein an edge detector evaluates a set of synchronized data samples each bit period to detect the location of a transition between respective, adjacent samples. Logic, in conjunction with a state machine comprising a plurality of respective counters, is employed to continually determine the "highest quality" data sample for each bit period based upon its sampling time being furthest from a detected edge transition. The clock phase corresponding to the selected highest quality data sample is used to select a respective incoming data sample from each bit period (i.e., as the "optimally phased" data sample). In preferred embodiments, abrupt shifts in the selected clock phase are prevented during reception of an incoming data packet in order to avoid disruption of the selected phase due to noise, etc., in the incoming data signal.

As will be apparent to those skilled in the art, other and further objects and advantages will appear hereinafter.

BRIEF DESCRIPTION OF THE DRAWINGS

The drawings illustrate both the design and utility of preferred embodiments of the present invention, in which:

FIG. 7 is a truth table describing the operation of a preferred decoder employed in the digital delay-locked loop circuit of FIG. 3;

FIG. 10 is a bit-flow diagram illustrating the process for selecting an optimally phased data sample in the digital phase acquisition circuit of FIG. 9.

DETAILED DESCRIPTION OF THE PREFERRED EMBODIMENTS

Figure 1:
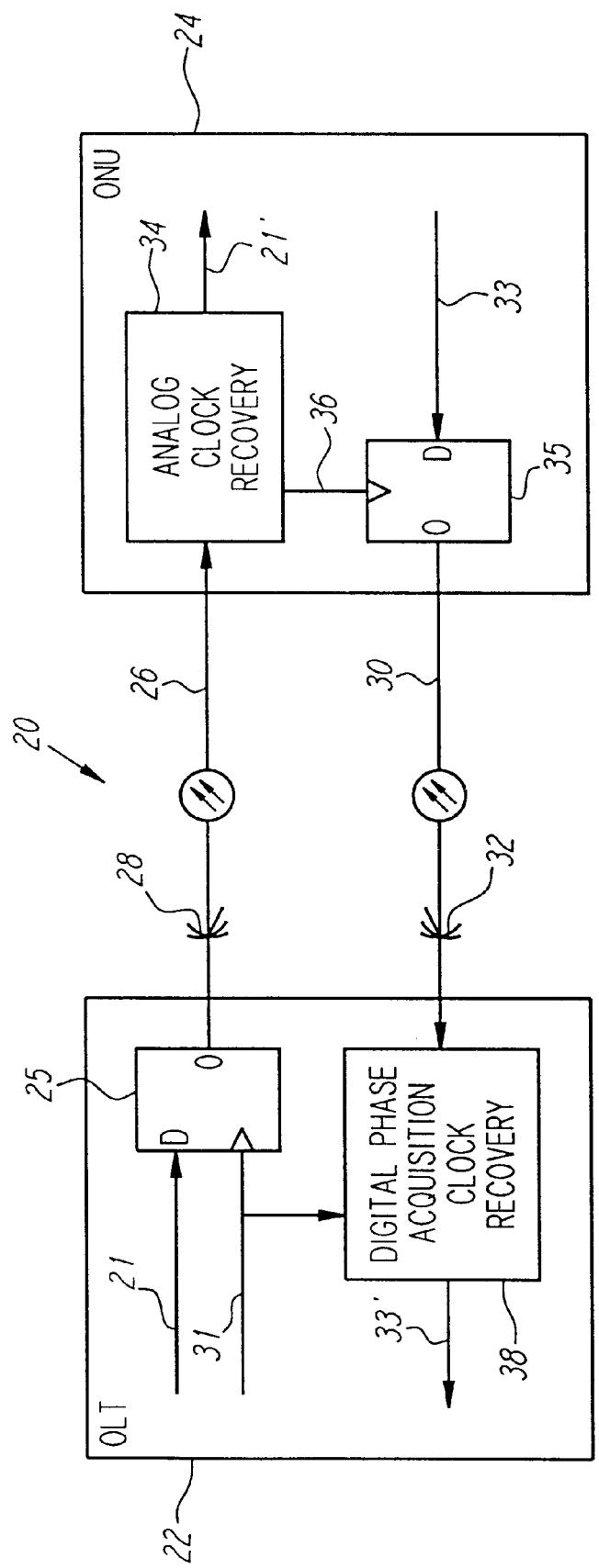
FIG. 1 is a block diagram of an exemplary passive optical network system.

Referring to FIG. 1, an exemplary passive optical network system 20 includes an optical line terminal ("OLT") 22 that transmits data to, and receives data from, respectively, a plurality of remotely located optical network units ("ONUs") 24. (For ease in illustration, only a single ONU 24 is depicted in FIG. 1). In particular, downstream digital data 21 from the OLT 22 is optically transmitted to the ONUs 24 in successive downstream TDM data packets over a downstream passive fiber distribution network 26, which includes an optical splitter 28 for dividing the respective downstream data signal from a single outgoing fiber onto multiple separate fibers extending to the respective ONUs 24. Conversely, upstream digital data 33 is periodically optically transmitted in respective upstream TDM data packets from the individual ONUs 24 over a passive upstream fiber distribution network 30, which includes an optical combiner 32 for combining multiple upstream fibers from respective ONUs 24 onto a single fiber received by the OLT 22.

The respective downstream and upstream data packets are preferably transmitted in data frames at a standard frame rate of 8 KHz—i.e., with each data frame transmitted every 125 microseconds. In accordance with a presently preferred transmission protocol, In particular, a framing pattern comprising several alternating zeros and ones occupies the first two bytes of each frame, wherein the framing bits are used for clock recovery. A communications ("COMM") packet generally occupies the next twenty bytes of each frame and is followed by a number of TDM payload data packets. The downstream data packet transmission is synchronized by a flip-flop 25 to a digital reference clock 31 having a standard frequency of 61.44 MHz—i.e., wherein one bit of data is transmitted during each reference clock cycle—with a transmission bit period of 16 nanoseconds), wherein a conventional analog clock recovery circuit 34 provided in each ONU 24 can both adequately recover the downstream data (referred to as 21') and generate a recovered 61.44 MHz clock signal 36 based on the downstream transmission timing. The upstream transmission timing is then synchronized by a respective flip-flop 35 to the recovered downstream clock signal 36 at each respective ONU 24. However, because the respective upstream signals travel over differing lengths of fiber and, thus, have a different delay and phase when received at the OLT 22, recovery of the upstream timing is more difficult and must be handled on a packet-by-packet basis.

To this end, a digital phase acquisition clock recovery circuit 38 is provided in the OLT 22 in order to receive and recover timing for the data 33 contained in upstream TDM packets transmitted from the respective ONUs 24, wherein the recovered upstream data is referred to as 33'. The digital phase acquisition clock recovery circuit 38 is clocked by a digital reference clock 31, which also controls the downstream transmission timing of the OLT transmitter 25. Timing for the passive optical network system 20 is thereby substantially synchronized to the reference clock 31, even though the delay through the passive optical network system 20 produces a phase shift that is different for each ONU 24.

Figure 2:
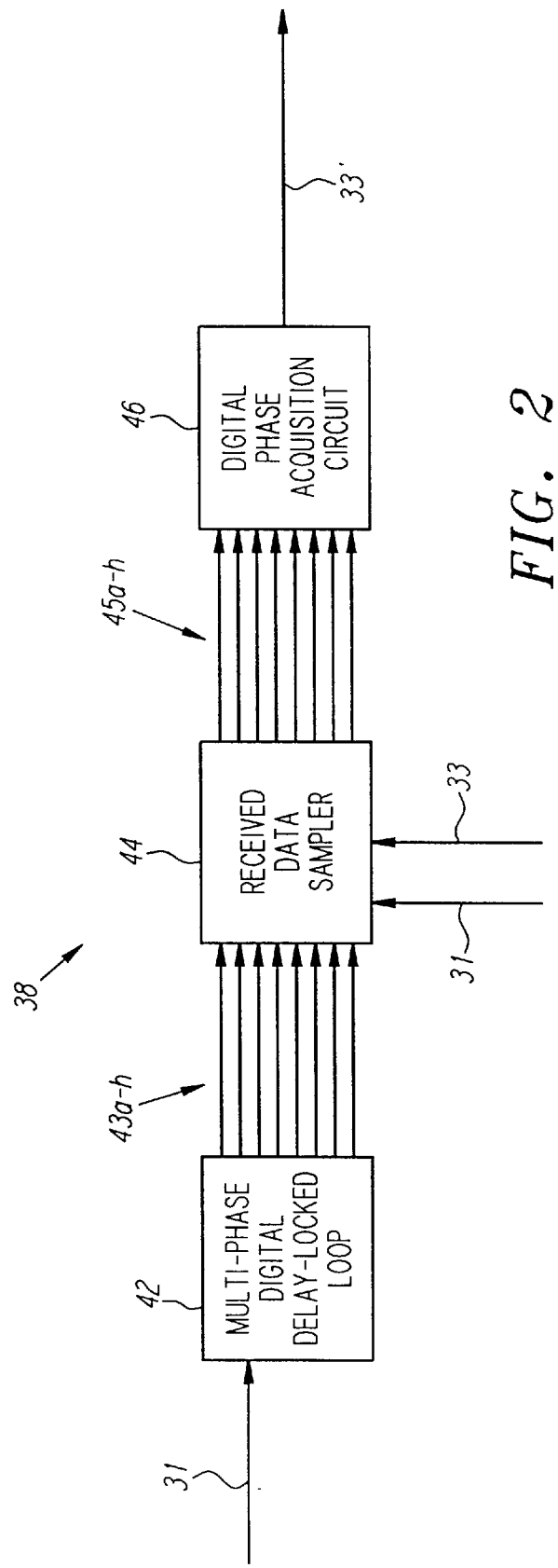
FIG. 2 is a block diagram of a preferred digital phase acquisition clock recovery circuit employed in the network of FIG. 1.

Referring to FIG. 2, the digital phase acquisition clock recovery circuit 38, which is preferably implemented as part of an application specific integrated circuit ("ASIC"), includes a multi-phase, digital delay-locked loop 42. In a manner described in greater detail in conjunction with FIGS. 3–7, the digital delay-locked loop receives the digital reference clock 31 as an input and generates eight clock phase signals 43a–h as an output, wherein the respective clock phase signals 43a–h are approximately equally spaced in time over one clock cycle of reference clock 31. In a manner described in greater detail in conjunction with FIG. 8, a received data sampler circuit 44 receives both the incoming upstream digital data signal 33 transmitted from the respective OLTs 22 and the clock phase signals 43a–h, and generates eight data samples 45a–h of the received data signal over each bit period, wherein the data samples 45a–h are synchronized to the reference clock 31. The synchronized data samples 45a–h are input into a digital phase acquisition circuit 46, which, as described in greater detail in conjunction with FIGS. 9–10, selects one of the data samples 45a–h as an "optimally phased" sample based on that sample having the highest "relative quality" as compared with the other samples in the respective bit period. A recovered upstream data signal 33' is then generated by selecting the sample from each bit period generated by the respective clock phase signal 43a–h corresponding to the optimally phased data sample.

A detailed description of a preferred method and apparatus for receiving the upstream optical TDM data packets and converting the upstream data 33 contained therein into an electrical digital data signal, respectively, is provided in U.S. patent application Ser. No. 08/619,851, filed Mar. 20, 1996, now U.S. Pat. No. 5,801,867, which is assigned to the assignee of the present application and which is fully incorporated herein by reference.

Figure 3:
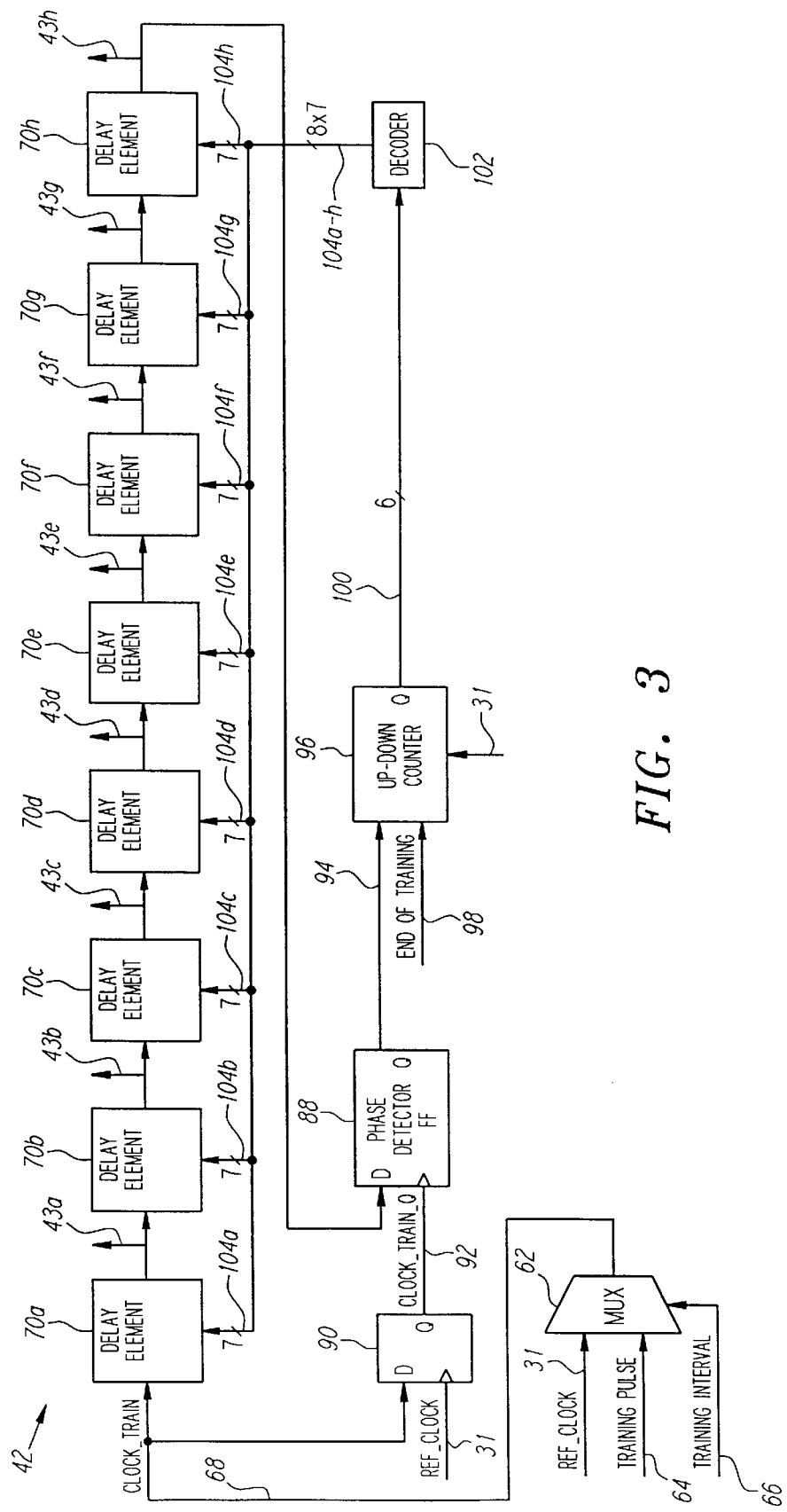
FIG. 3 is a block diagram of a preferred digital delay-locked loop circuit employed in the clock recovery circuit of FIG. 2.

Referring to FIG. 3, the digital delay-locked loop 42 includes a first selector mux 62, which receives as inputs the reference clock 31 and a training pulse signal 64. The selector mux 62 also receives a training interval signal 66 at a selector input. The selector mux 62 outputs a clock_train (i.e., "clock" or "train") signal 68, which is the reference clock 31 if the training interval signal 66 is "low" (i.e., a digital zero), or is the training pulse signal 64 if the training interval signal is "high" (i.e., a digital one).

The train_clock signal 68 is input through eight, successively connected delay circuits 70a–h, wherein the first delay circuit 70a receives as an input the train_clock signal 68, and the remaining delay circuits 70b–h receive as inputs a respective output signal 43a–g from an immediately preceding delay circuit 70a–g. The actual delay imposed through each of the individual delay circuits 70a–h is selectively controlled such that the cumulative delay through all of the delay circuits 70a–h is approximately equal to one clock cycle period of the reference clock 31.

Thus, based on a standard upstream telephony frame transmission rate of 8 KHz, with one reference clock cycle being approximately sixteen nanoseconds, each of the delay circuits 70a–h has a controlled delay of approximately two nanoseconds. In other words, the first delay circuit 70a receives the train_clock signal 68 from the selector mux 62, delays it for roughly two nanoseconds, and outputs a first (delayed) clock phase signal 43a. The second delay circuit 70b receives the first clock phase signal 43a from delay circuit 70a, delays it for roughly two more nanoseconds, and outputs a second (further delayed) clock phase signal 43b. The process continues, with resultant further delayed clock phase signals 43c–g each being roughly two more nanoseconds delayed time, until the final delay circuit 70h outputs the "last" clock phase signal 43h, for an overall delay of sixteen nanoseconds.

In addition to the plurality of delay circuits 70a–h, the train_clock signal 68 is also input into a synchronizing flip-flop 90, which is clocked by the reference clock 31. Flip-flop 90 holds the train_clock signal 68 for exactly one clock cycle period and outputs a (one-cycle) "delayed" train_clock signal 92, which is used to clock a phase detector flip-flop 88. In particular, the phase detector flip-flop 88 receives the final clock phase signal 43h from the final delay circuit 70h, and generates an output signal 94 that is high if the clock phase signal 43h rises to high before the delayed train_clock signal 92, and is low if the delayed train_clock signal 92 rises to high before the clock phase signal 43h, respectively. In other words, the phase detector flip-flop 88 compares the phases of its two input signals, 86 and 92, generating a digital one if the signal 86 is earlier in phase than the delayed train_clock signal 92, and otherwise generating a digital zero. In this manner, the overall transmission time through the collective delay circuits 70a–h is compared to the transmission time of a single clock cycle of the reference clock 31.

An up-down counter 96 receives the phase detector output signal 94 of the phase detector flip-flop 88. The counter 96 is enabled by an "end-of-training" pulse 98, such that, when signal pulse 98 is high, the counter 96 is either incremented or decremented, depending on the state of the phase detector output signal 94. The counter 96 is clocked by the reference clock 31, such that, when enabled by the end-of-training pulse 98, the counter is incremented or decremented, respectively, once per reference clock cycle. More particularly, the counter 96 is incremented if output signal 94 is high, (i.e., indicating that the total delay through the delay circuits 70a–h is less than a full clock cycle of the reference clock 31), or is decremented if output signal 94 is low (i.e., indicating that the total delay through the delay circuits 70a–h is greater than a full reference clock cycle).

The up-down counter 96 outputs an ongoing "count" in the form of a six bit binary-count output signal 100, which is input into a decoder 102. The decoder 102 outputs an 8×7 array of selector control outputs 104a–h based on a preset truth table (shown in FIG. 7)—i.e., wherein the decoder 102 transmits a first seven-bit control output signal 104a to delay circuit 70a, a second seven-bit output signal 104b to delay circuit 70b, a third seven-bit control output signal 104c to delay circuit 70c, a fourth seven-bit output signal 104d to delay circuit 70d, a fifth seven-bit control output signal 104e to delay circuit 70e, a sixth seven-bit output signal 104f to delay circuit 70f, a seventh seven-bit control output signal 104g to delay circuit 70g, and an eighth seven-bit output signal 104h to delay circuit 70h, respectively. In a manner described in greater detail in conjunction with FIGS. 4–7, the respective decoder output signals 104a–h control the actual delay time through the corresponding delay circuits 70a–h.

In a presently preferred embodiment, each of the respective delay circuits 70a–70h is configured essentially in the same manner, with the exception that alternating delay circuits (i.e., 70b, 70d, 70f and 70h) each include an additional front and back end inverter, as described below. Thus, for ease in illustration, the first delay circuit 70a is depicted in FIG. 4, in which delay circuits 70c, 70e and 70g are substantially identical, and the second delay circuit 70b is depicted in FIG. 5, in which delay circuits 70d, 70f and 70h are substantially identical, respectively.

Figure 4:
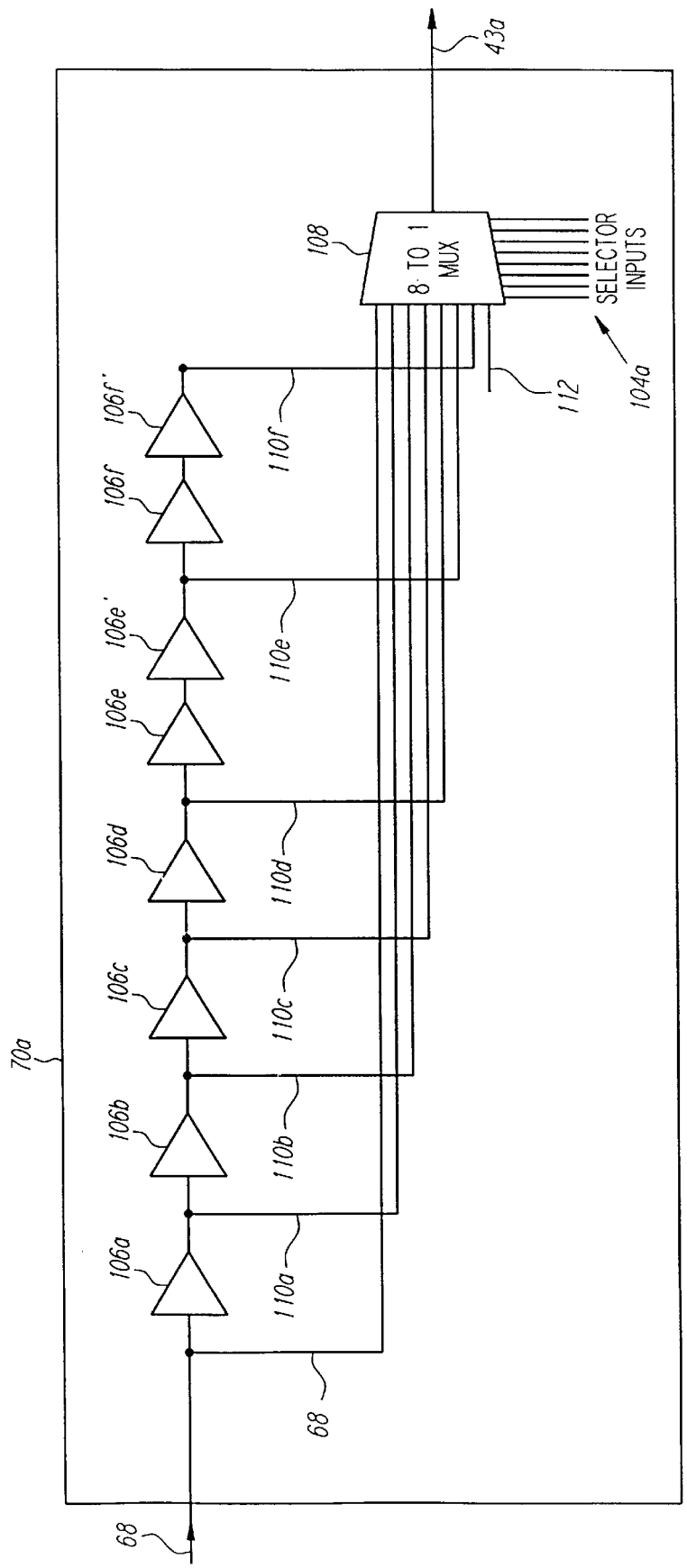
FIG. 4 is a block diagram of a first preferred delay element used in the digital delay-locked loop circuit of FIG. 3.
Figure 5:
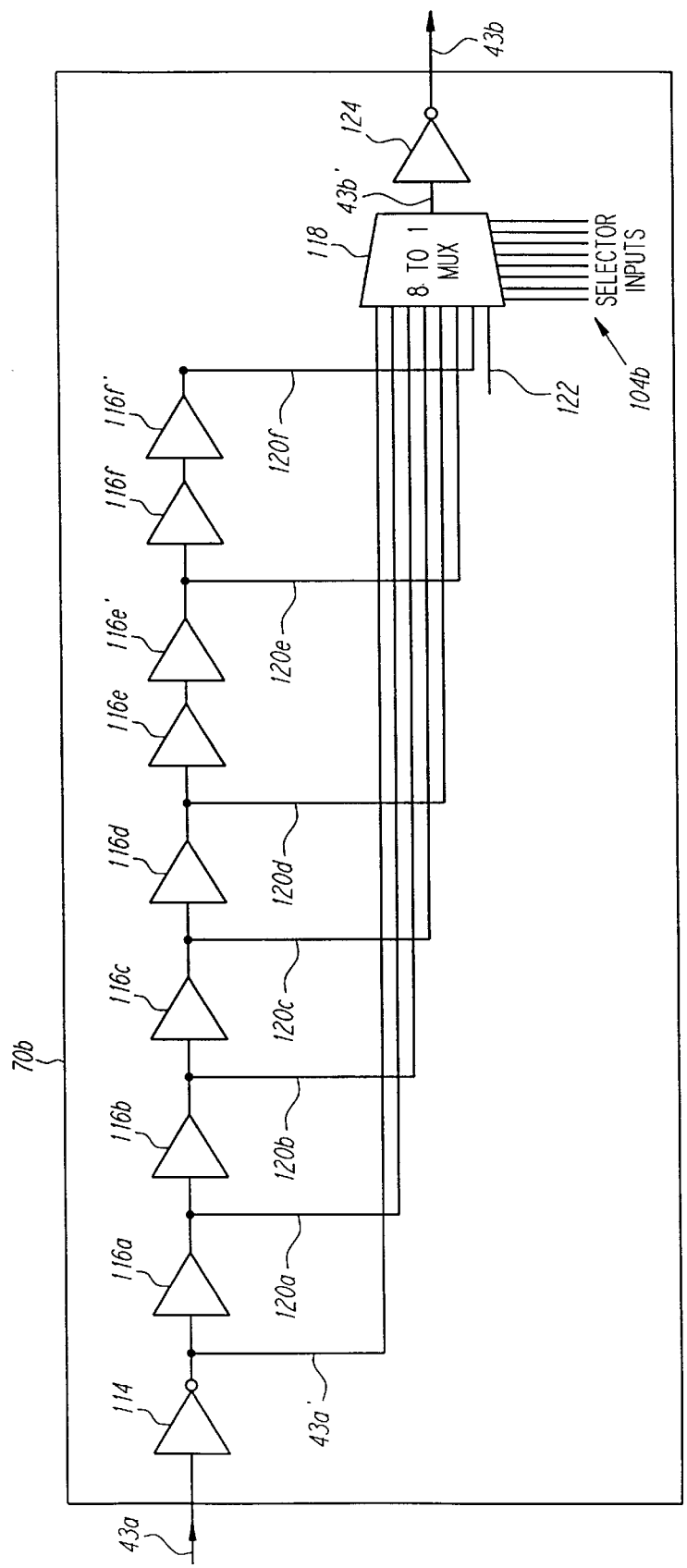
FIG. 5 is a block diagram of a second preferred delay element used in the digital delay-locked loop circuit of FIG. 3.

In particular, referring to FIG. 4, delay circuit 70a comprises six, successively connected internal buffer elements 106a–f, wherein the first buffer element 106a receives as an input the train_clock signal 68, and the remaining buffer elements 106b–f receive as an input a respective output signal 110a–e of the immediately proceeding buffer element 106\1a–e, respectively. Each of the buffer elements 106a–f imposes a throughput time delay that varies with temperature, manufacturing process, supply voltage, etc, such that their respective output signals 110a–f are successively displaced in time. By way of example, in the aforedescribed, presently preferred embodiment in which each of the delay circuits 70a–h has a controlled delay time of approximately two nanoseconds, the respective internal buffer elements 106a–f are preferably selected to have a delay period of between one-quarter of one nanosecond to one nanosecond.

The delay circuit 70a also includes a selective output mux 108, which is configured to receive at successive inputs the clock_train signal 68 and each of the output signals 110a–f of the internal buffer elements 106a–f, respectively. The selective output mux 108 is further configured to receive the seven-bit decoder output signal 104a as a selector input, wherein the mux outputs as the first clock phase signal 43a a selected one of the input signals, i.e., 68, 110a, 110b, 110c, 110d, 110e, or 110f, depending upon which of the seven bits in signal 104a is set to high by the decoder 102. In this manner, the decoder 102 controls the active path through the delay circuit 70a, thereby controlling the actual delay time therethrough. The selective output mux 108 also has an input for receiving an externally generated clock signal 112 used for test purposes—i.e., wherein each of the delay circuits 70a–h preferably has its own external clock input.

As will be apparent to those skilled in the art, the delay through the selective output mux 108 will also vary with temperature, manufacturing process and supply voltage, and is also preferably between one-quarter of one nanosecond to one nanosecond. Thus, a minimum throughput delay is imposed through the delay circuit 70a, even where the mux 108 outputs the initial input signal (i.e., clock_train 68). As will also be apparent to those skilled in the art in view of the present disclosure, the later buffer elements 106e–f will only be included in the active path through delay circuit 70a when delays are relatively short—i.e., the output signals from the later buffer elements 106e–f will only be selected through the mux 108 where, for whatever reason, the total delay through all of the delay circuits 70a–h is relatively low.

For this reason, the last two buffer elements 106e and 106f each comprise additional buffers 106e' and 106f', respectively, in order to provide an additional throughput delay—i.e., such that, in a best-case scenario for temperature and other variables, the throughput delay through the delay circuit 70a resulting from incorporating further buffers 106e' and 106f' in buffer elements 106e and 106f, respectively, will be no greater than the throughput delay of a single buffer element under worst-case conditions. Further, the additional buffers 106e' and 106f' in buffer elements 106e and 106f, respectively, help to ensure that the total delay through the delay circuits 70a–h can be greater than or equal to one period of the reference clock 31, even under best-case conditions.

The respective buffer elements 106a–f are preferably implemented as pairs of inverters (two successive pairs of inverters in the case of buffer elements 106e–f) that delay rising and falling edges of the respective clock signal equally. However, it has been discovered during implementation of a presently preferred embodiment that the selective output mux 108 delays the propagation on rising signal edges differently than on falling signal edges of the clock signal. Thus, to avoid excessive duty cycle distortion, every other delay circuit, i.e., 70b, 70d, 70f, and 70h, respectively, includes an additional inverter both before and after its respective output mux, so that each successive pair of delay circuits 70a–h adds the same "mux delay" to the falling edge of the clock signal as to the rising edge of the clock signal.

Referring to FIG. 5, to compensate for the aforedescribed propagation differential through the selector mux 108 of the first delay circuit 70a, the second delay circuit 70b includes an input inverter 114, which receives and inverts the first clock phase signal 43a before it is passed through the rest of the delay circuit 70b. Otherwise, as with the first delay circuit 70a, the second delay circuit 70b comprises six, successively connected internal buffer elements 116a–f, wherein the first buffer element 116a receives as an input the inverted first clock phase signal 43a', and the remaining buffer elements 116b–f receive as an input a respective output signal 120a–e of the immediately proceeding buffer element 116a–e, respectively. The buffer elements 116a–f are preferably identical to the buffer elements 106a–f employed in the first delay circuit 70a, e.g., wherein each is implemented as a pair of inverters having a throughput delay period of between one-quarter of one nanosecond to one nanosecond for preferred embodiments employing a 16 nanosecond reference clock cycle, and wherein additional buffers 116e' and 116f' are added to buffer elements 116e and 116f, respectively, to provide sufficient throughput delay.

The second delay circuit has a selective output mux 118, which is configured to receive at successive inputs the respective, the inverted first clock phase signal 43a' and each of the output signals 120a–f of the internal buffer elements 116a–f, respectively. The selective output mux 118 is further configured to receive the seven-bit decoder output signal 104b as a selector input, wherein the mux 118 outputs as the second clock phase signal 43b' (the prime (') being added since the signal is momentarily still inverted) a selected one of the input signals, i.e., 43a', 120a, 120b, 120c, 120d, 120e, or 120f, depending upon which of the seven bits in signal 104b is set to high by the decoder 102. In this manner, the decoder 102 controls the active path through the delay circuit 70b, thereby controlling the actual delay time therethrough. As with the output mux 108 of the first delay circuit 70a, the selective output mux 118 of the second delay circuit 70b also has an input for receiving an externally generated clock signal 122 used for test purposes.

To compensate for the propagation differential between the rising and falling clock edges through the selector mux 118, the second delay circuit 70b also includes an output inverter 124, which receives and inverts the (inverted) second clock phase signal 43b' to the (non-inverted) second clock phase signal 43b, before it is passed into the succeeding delay circuit 70c.

Figure 6:
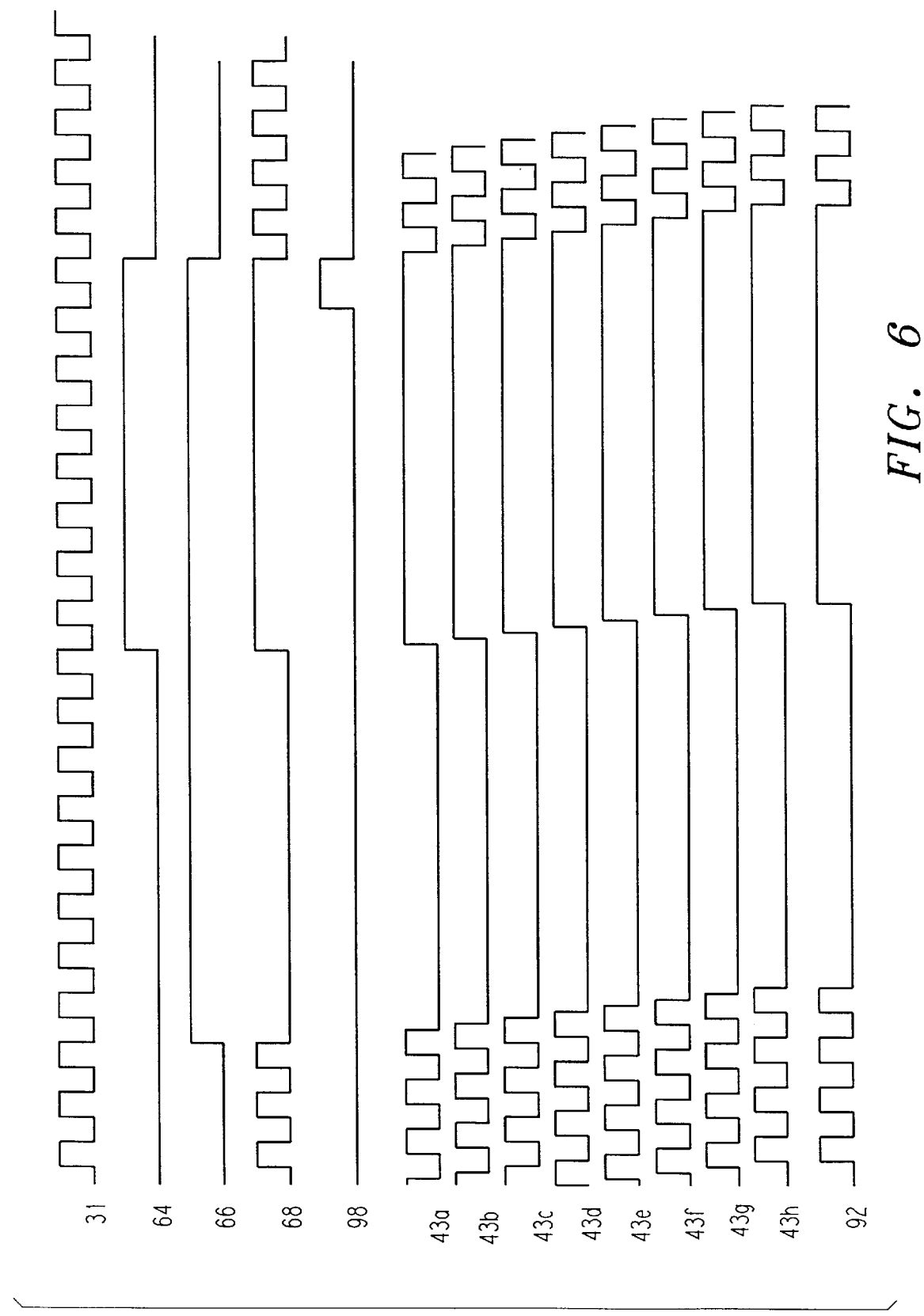
FIG. 6 is a timing diagram of various input and output signals within the delay-locked loop circuit of FIG. 3.

For purposes of further illustration, the various output clock signals of the digital delay-locked loop 42 are depicted in FIG. 6. In particular, referring also again to FIG. 3, the purpose of periodically inserting the low-frequency training pulse 64 through the respective delay circuits 70a–h (i.e., by setting the training interval 66 to high at the selector mux 62) is to avoid locking in to a harmonic or subharmonic of the reference clock 31, given the wide variation in delay times of digital circuits over temperature and process, e.g., wherein the worst-case delay time can be up to three times the length of best-case delay time. In a presently preferred embodiment, the training interval, which is preferably implemented at a falling edge of the reference clock 31, is selected to have a duration of sixteen clock periods (i.e., 256 nanoseconds for a selected reference clock cycle of 16 nanoseconds), wherein during the first eight clock periods, the training pulse 64 is low and during the subsequent eight clock periods, the training pulse 64 is high, such that there is only one clock edge, or transition, between one and zero throughout the training interval 66.

The clock phase signals 43a–h are normally phase-shifted over each clock period, i.e., where the falling edge of the final clock phase signal 43h from a given clock cycle of the reference clock 31 has a rising edge at approximately the same time as the rising edge of the ensuing reference clock cycle. So long as the total delay through the respective delay circuits 70a–h is substantially equal to a reference clock cycle, the rising edge of the final clock phase signal 43g will also track the rising edge of output signal 92 of the synchronizing flip-flop 90. As can be seen, however, once the training interval 66 begins and the training pulse (and, thus, clock_train signal 68) remains low for the ensuing eight clock cycles, each of the clock phase signals 43a–h will also remain low upon their respective ensuing falling edge from the previous reference clock cycle. After the eighth clock cycle of the training interval 66, the training pulse 64 (and, thus, the clock_train signal 68) is set to high for the next ensuing eight clock cycles, each of the clock phase signals 43*a–h* will also go to high, i.e., in a correspondingly phased-manner over a single reference clock cycle.

In a presently preferred embodiment, the end-of-training pulse 98 is set to high for only the final reference clock cycle of each training pulse 64, thereby enabling the up-down counter 96 to be incremented or decremented, respectively, based on only the last high or low output 94 from the phase detection comparison through the phase detector flip-flop 88, i.e., based on the comparison through flip-flop 88 once the training pulse 64 switched to high during the training interval 66. As such, so long as the total delay through the respective delay circuits 70*a–h* does not exceed eight reference clock cycles, which can be easily avoided by selection of conventional digital circuit components having even a marginal accuracy level, the delay-locked loop 42 will not improperly lock to a harmonic or subharmonic of the reference clock 31.

As will be apparent to those skilled in the art, the respective duty cycles of the training pulse 64, training interval 66 and end-of-training pulse 98 can be selected and controlled by a conventional digital circuit control logic based on the reference clock 31. In a presently preferred embodiment, a training interval 66 is imposed at the beginning of each new upstream data frame during the two byte framing pattern preceding the COMM packet, so that no actual upstream data is lost while the throughput delay through the respective delay circuits 70*a–h* is calibrated.

A presently preferred truth table 105 for the decoder 102 is shown in FIG. 7. The output "count" signal 100 of the up-down counter 96 is represented by a six-bit hexadecimal (hex) value, wherein the count signal 100 has a range of forty-eight values, from 0 (i.e., 000000) to 2*f* (i.e., 101111). The respective output words (i.e., control signals) 104*a–h* are transmitted in a seven-bit hex form, wherein the range of words are such that only one of seven bits will be set to high in each of the respective signals 104*a–h*, depending on the counter output 100. In particular, the possible output signal words 104*a–h* are as follows:

01 (i.e., "0000001"), in which case the respective delay circuit output mux outputs the respective input signal (i.e., "no delay"), e.g., clock_train signal 68 in the case of the first delay circuit 43*a;*

02 (i.e., "0000010"), in which case the respective delay circuit output mux outputs the respective first buffer element output signal, e.g., signal 110*a* in the case of the first delay circuit 43*a;*

04 (i.e., "0000100"), in which case the respective delay circuit output mux outputs the respective second buffer element output signal, e.g., signal 110*b* in the case of the first delay circuit 43*a;*

08 (i.e., "0001000"), in which case the respective delay circuit output mux outputs the respective third buffer element output signal, e.g., signal 110*c* in the case of the first delay circuit 43*a;*

10 (i.e., "0010000"), in which case the respective delay circuit output mux outputs the respective fourth buffer element output signal, e.g., signal 110*d* in the case of the first delay circuit 43*a;*

20 (i.e., "0100000"), in which case the respective delay circuit output mux outputs the respective fifth buffer element output signal, e.g., signal 110*e* in the case of the first delay circuit 43*a;* or 40 (i.e., "1000000"), in which case the respective delay circuit output mux outputs the respective sixth buffer element output signal, e.g., signal 110*f* in the case of the first delay circuit 43*a*.

As will be apparent in view of the present disclosure to those skilled in the art, the initial count signal (i.e., at a time=0 occurring at the beginning of each newly received upstream data packet) may be arbitrarily set, as the counter 96 will rapidly adjust (in either direction) to a state of relative equilibrium during the training intervals 66 of the initial data frames of the incoming packet.

As can be observed from the truth table 105, the decoder 102 adjusts the individual delay times of the respective delay circuits 70*a–h* in an offset order—i.e., first delay circuit 70*a*, then delay circuit 70*e*; then delay circuit 70*c*; then delay circuit 70*g*; then delay circuit 70*b*; then delay circuit 70*f*; then delay circuit 70*d*; and finally delay circuit 70*h*, respectively. The order of adjustment is repeated for each new adjustment level—i.e., as the respective active delay path through each delay circuit 70*a–h* is increased. This preferred order of adjustment allows the overall delay to be substantially uniformly distributed over the eight successive delay circuits 70*a–h*.

In a presently preferred embodiment, the decoder 102 will also be configured to transmit a respective control signal (not shown) to each respective selective output mux for selecting the test clock input—e.g., test input 112 of delay circuit 70*a*, and test input 122 of delay circuit 70*b*, respectively—as the respective selected output clock phase signal of the delay circuits 70*a–h*.

Figure 8:
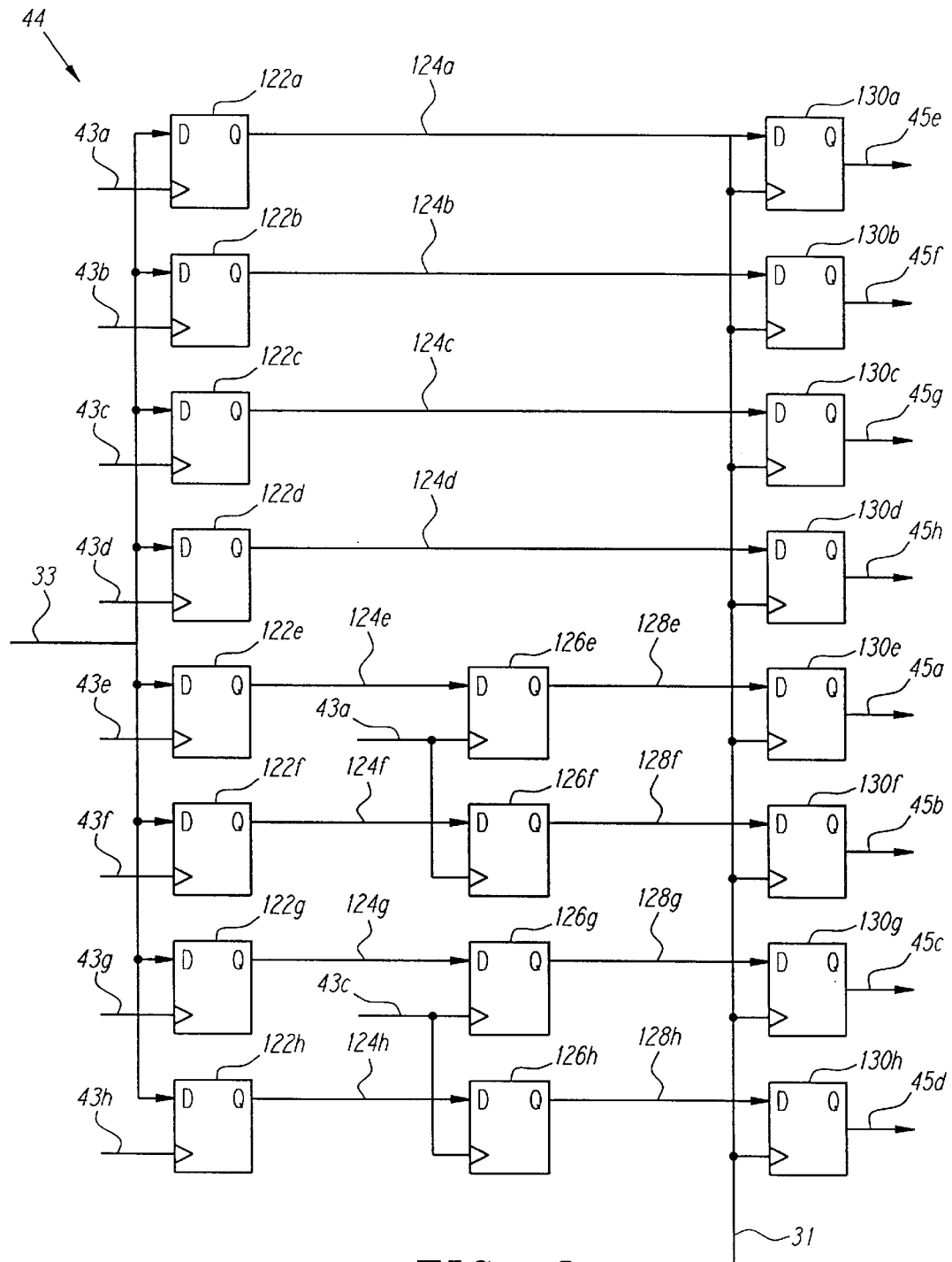
FIG. 8 is a block diagram of a preferred received data sampler circuit employed in the clock recovery circuit of FIG. 2.

Referring to FIG. 8, the received data sampler circuit 44 has eight sampling flip-flops 122*a–h*, each configured to receive the upstream digital data signal 33. The sampling flip-flops 122*a–h* are clocked by the respective clock phase signal 43*a–h*—i.e., where sampling flip-flop 122a is clocked by clock phase signal 43*a*, sampling flip-flop 122*b* is clocked by clock phase signal 43*b*, and so forth. In this manner, each of the respective flip-flops 122*a–h* outputs a respective data sample 124*a–h*, wherein the data samples are taken at respective rising edges of the corresponding clock phase signals 43*a–h*, such that samples 124*a–h* are spaced in time in the same phase relationship as the clock phase signals 43*a–h*. In a presently preferred embodiment employing a standard telephony transmission timing based on a 61.44 MHz reference clock having a 16 nanosecond clock cycle, each respective set of clock phase samples 43*a–h* correspond with an incoming bit period in the upstream digital data signal 33, with the respective data samples 124*a–h* thereby taken on a bit period-by-bit period basis.

In order to synchronize the data samples 124*a–h* to the reference clock 31, a set of eight synchronizing flip-flops 130*a–h* are also provided in the received data sampler circuit, each clocked by the reference clock 31. In particular, output data samples 124*a–d* are directly input into synchronizing flip-flops 130*a–d*. However, in order to stay clear of the rising edge of the reference clock 31, output data samples 124*e–h* are input into corresponding interim flip-flops 126*e–h*, wherein flip-flops 126*e* and 126*f* are clocked by an ensuing rising edge of the first clock phase signal 43*a*, and flip-flops 126*g* and 126*h* are clocked by an ensuing rising edge of the second clock phase signal 43*c*, respectively. The "delayed" output data samples 128*e–h* from the interim flip-flops 126*e–h* are then input into the synchronizing flip flops 130*e–h*, respectively.

As will be observed by those skilled in the art, the respective rising edge of clock phase signals 43*a* and 43*c* that clock the interim flip-flops 126*e–h* are from a subsequent reference clock cycle than the respective rising edges used to clock the sampling flip-flops 122*a–h* for a respective bit period of the incoming data signal 33. As a result, the data samples output from synchronizing flip-flops 130*a–d* were taken a full reference clock cycle ahead of the data samples output from the synchronizing flip flops 130*e–h* at each reference clock cycle.

In other words, the "effective" sampling bit period of the synchronized data samples is shifted by half a bit period, wherein the output data samples of the synchronizing flip-flops 130*e*–130*f* actually correspond to the first four samples 45*a–d* of an "adjusted" sample bit period, and the output data samples of the synchronizing flip-flops 130*a*–130*d* correspond to the last four samples 45*e–h*, respectively. As such, in a presently preferred embodiment, synchronized data samples for a given bit period 45*a–d* are "mapped" with respective clock phase signals 43*e–h* of a "prior" reference clock cycle, and synchronized data samples 45*e–h* are "mapped" with respective clock phase signals 43*a–d* of a very next reference clock cycle.

Figure 9:
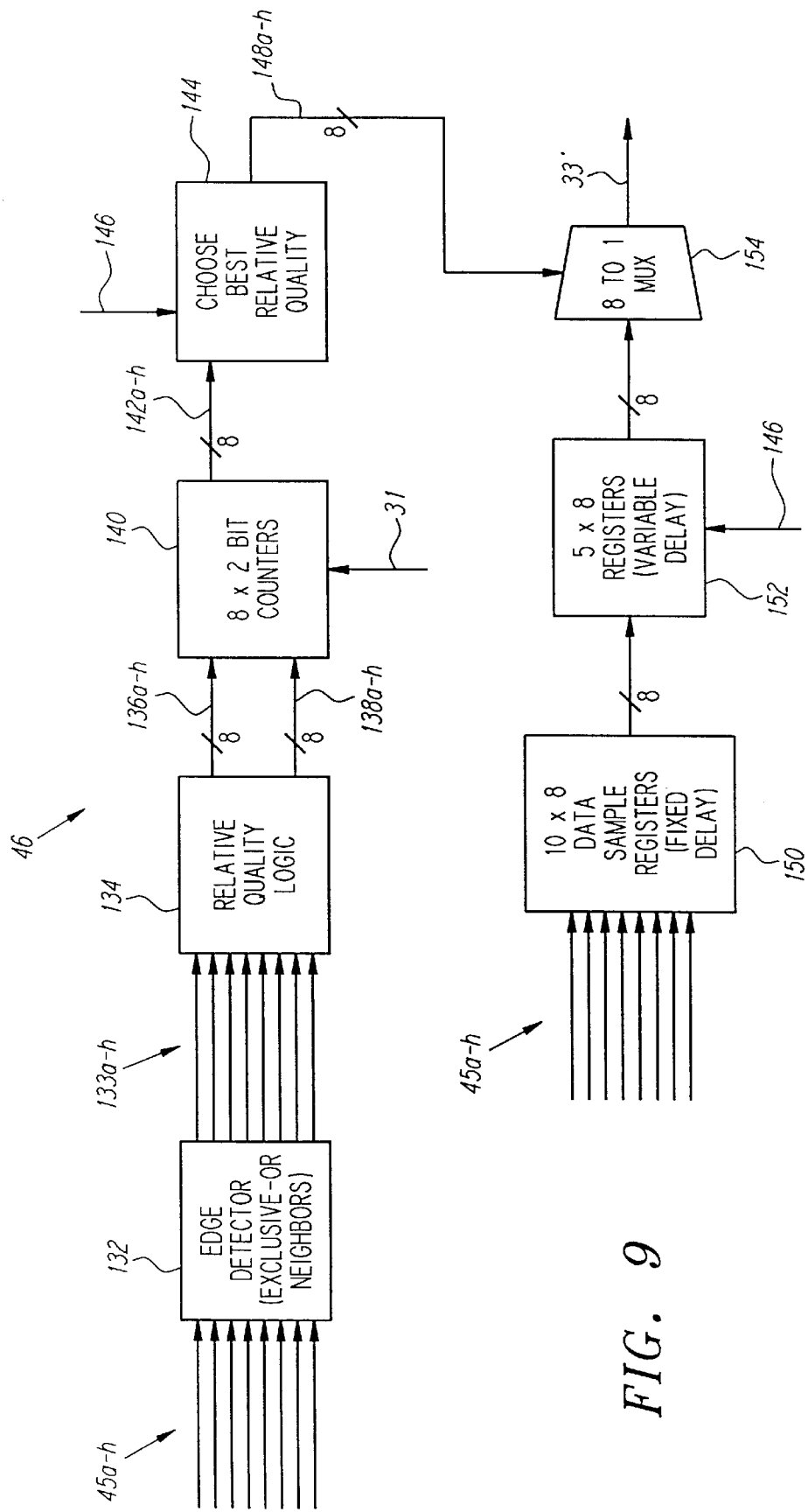
FIG. 9 is a block diagram of a preferred digital phase acquisition circuit employed in the clock recovery circuit of FIG. 2.

Referring to FIGS. 9 and 10, the digital phase acquisition circuit 46 includes an edge detector circuit 132, which receives the synchronized data samples 45*a–h* of the received upstream data 33 for each "adjusted" bit period and performs an exclusive-OR function between each respective neighboring pair of the samples 45*a–h*, wherein each first sample 45*a* of a "new" bit period is evaluated with respect to the last data sample 45*h* of the preceding bit period, to generate eight corresponding receivededge signals 133*a–h* over each bit period of the incoming data signal 33. In particular, the exclusive-OR function results in a digital value of one only if the respective adjacent signals have opposite values, e.g., if the first signal has a value of one, and the second signal has a value of zero, or vice versa. In other words, the exclusive-OR result is one only if an edge, or transition between zero and one, is detected. Otherwise, the exclusive-OR result is zero.

By way of illustration, as seen in FIG. 10, as indicated by the dashed lines 131, the first sample 45*a* of a bit period m is exclusive-OR' d with the last data sample 45*h* of a preceding bit period 1. Since both respective data samples (i.e., 45*h* of bit period 1 and 45*a* of bit period m) are zero, no edge is present and a corresponding received edge signal 133*a* also of value zero is associated with bit period m. This process is repeated for each pair of adjacent samples in bit period m, i.e., between phase sample 45*a* (zero) and phase sample 45*b* (zero) to generate received edge signal 133*b* (zero—no edge); between phase sample 45*b* (zero) and phase sample 45*c* (one) to generate received edge signal 133*c* (one—since an edge is detected); between phase sample 45*c* (one) and phase sample 45*d* (one) to generate received edge signal 133*d* (zero—no edge), and so forth, such that a corresponding set of eight received edge signals 133*a–h* are generated for each bit period of data phase samples. FIG. 10 illustrates the generation of received edge signals 133*a–h* based on data phase samples taken over three consecutive bit periods m, n and q, wherein an edge occurs between the second and third samples (i.e., 45*b* and 45*c*) of each bit period, such that received edge signal 133*c* is set to one for each corresponding set of received edge signals 133*a–h*.

The received edge signals 133*a–h* are evaluated by "relative quality" logic circuitry 134, which generates a corresponding pair of relative quality signals 136*a–h* and 138*a–h* over each bit period. As will be appreciated from the present disclosure by those skilled in the art, the relative-quality logic 134 serves as a powerful technique for integrating and reducing the information on the position of the edges in the received data samples 45*a–h* over multiple bit periods. In particular, the respective values in "increment" signal 136*a–h* are set to high for each of the three consecutive phase samples following a detected edge, and are otherwise set to low. The respective values in "decrement" signal 138*a–h* are set to high for each of the three consecutive phase samples preceding a detected edge, and are otherwise set to low. In other words or each of the individual values in the relative quality increment signal 136*a–h* are set to high whenever the corresponding data sample 145*a–h* is further from a detected edge in the than is the ensuing data sample. Conversely, the individual values in the relative quality decrement signal 138*a–h* are set to high whenever the corresponding data sample 45*a–h* is closer to a detected edge than is the preceding data sample.

In the case that a respective edge signal is detected less than three sample phases from either the first data sample phase position 45*a* or last data sample phase position 45*h*, a "wrap-around" is employed in signals 136*a–h* and 138*a–h*, respectively. By way of illustration, FIG. 10 shows the relative quality logic increment and decrement signals 136*a–h* and 138*a–h* corresponding to the received edge signals 133*a–h* generated over the three consecutive bit periods m, n and q, respectively. As can be seen, an edge is detected corresponding to data sample 46*c*, with the relative quality increment signal 136 set to high in corresponding phases 136*d*, 136*e* and 136*f*, and the relative quality decrement signal 138 set to high in corresponding phases 138*b*, 138*a* and (via wrap-around) 138*h*, respectively.

The relative quality increment and decrement signals 136*a–h* and 138*a–h* are used to increment or decrement, respectively, a set of eight corresponding two-bit counters 140*a–h* (not shown) in a state machine 140. In accordance with a presently preferred algorithm, each of the two-bit counters 140*a–h* can hold one of four values: (01), (00), (10) or (11), which correspond to respective relative quality "values" +2, +1, −1 and −2, wherein the most significant bit of each counter corresponds to its sign (i.e.,"+" or "−") and the least significant bit corresponds to its value (i.e., "1" or "2"). In particular, a positive value in the relative quality increment signal 136*a–h* acts to increment the corresponding counter 140*a–h*, and a positive value in the relative quality decrement signal 138*a–h* acts to decrement the corresponding counter 140*a–h*, respectively, wherein no counter can be incremented beyond a positive value of +2 or decremented beyond a negative value of −2, respectively. Since there is no possible "zero" value, a respective counter 140*a–h* having a current value of −1, if incremented, will have a new value of +1. Likewise, a respective counter 140*a–h* having a current value of +1, if decremented, will have a new value of −1. Notably, the values stored in the two-bit counters for any given sample bit period reflect the integrated values of the increment and decrement signals 136*a–h* and 138*a–h* over the previous bit periods, but not including the current bit period.

By way of illustration, FIG. 10 shows the ongoing values stored in the two-bit counters 140*a–h*, as they are respectively incremented and decremented by the relative quality increment and decrement signals 136*a–h* and 138*a–h*. As will be apparent from the present disclosure to those skilled in the art, the values stored in the counters 140*a–h* during bit period m are based on the results of th preceding bit period and, for purposes of illustration, may be arbitrarily set, e.g., to {+1,−1,+1,−1,−1,+1,−1,+1,}. The respective relative quality values in signals 136*a–h* and 138*a–h* generated from the respective received edge signals 133*a–h* from the data samples 45a–h in bit period m are used to increment or decrement, respectively, the counter values 140a–h of bit period m, with the resulting values {−1,−2,+1,+1,+2,+1,−1,−2} "corresponding" to the following bit period n, as indicated by dashed line 137. Likewise, the respective relative quality values in signals 136a–h and 138a–h generated for bit period n are used to increment or decrement, respectively, the counter values 140a–h of bit period n, with the resulting values {−2,−2,+1,+2,+2,+2,−1,−2} corresponding to the following bit period q, as indicated by dashed line 139.

Occasionally, multiple edges can occur in one bit time. Consequently, a more complex algorithm is used in a presently preferred embodiment to determine when to update the respective counters 140a–h. In particular, with multiple edges in one bit time of received data, some of the counters 140a–h will have both an increment signal 136a–h and a decrement signal 138a–h generated at this stage. In this case, each of the relative-quality increment signals 136a–h is true (i.e., high) for a given data sample pair N if data sample pair N is in the middle of one, three, or five data sample pairs with no edges followed by an edge in the next (i.e., lower numbered) data sample pair in time. Similarly, each of the relative-quality decrement signals 138a–h is true for the data sample pair N if the data sample pair N is in the middle of one, three, or five data sample pairs with no edges preceded by an edge in the previous (i.e., higher numbered) data sample pair in time.

Thus, the eight two-bit counters 140a–h are updated each bit period, wherein a positive value indicates that the corresponding data sample 45a–h is of higher quality than the ensuing sample in time, e.g., if a value of counter 140f, is positive, sample 45f is of higher relative quality than the next data sample 45g—i.e., sample 45f is been farther from detected data edge than sample number 45g. Similarly, if a value of a counter 140–h is negative, the corresponding data sample 45a–h is of lower relative quality than is the ensuing sample, i.e., the ensuing sample is farther from a detected edge. In this manner, the relative-quality circuit 134 provides for the position of the several previous edges in the received data samples 45a–h to be condensed into eight, two-bit binary counter values.

As will be apparent from the present disclosure to those skilled in the art, an advantage of using two-bit counters is that relatively simple, fast counter logic results, while some integration of relative quality is provided so that received noise resulting in a misplaced edge will not change the sign of any given counter. In this regard, two successive increment or decrement operations are required to change the sign of any given counter 140a–h when saturated at either +2 or −2, as will typically be the case.

The state machine 140 generates an output signal 142a–h comprising the respective most significant bit values of each counter 140a–h, ie., where each value in the signal 142a–h represents the sign of the respective counter 140a–h for the current bit period. Thus, a respective value in signal 142a–h is high if the corresponding counter 140a–h is either −1 or −2, and is low if the corresponding counter value is either +1 or +2. By way of illustration, the values for the output signal 142a–h corresponding to bit periods m, n and q, respectively, are shown in FIG. 10.

The counter output signal 142a–h is evaluated by a further logic circuit 144, which determines therefrom a "best phase" data sample, defined as the sample having the best "relative quality" as compared to the other samples in its respective bit period, i.e., by its being furthest from a detected edge. In particular, the best phase data sample is determined by the logic 144 based on a detected change in a value from low to high (i.e., from zero to one) in signal 142a–h. The logic circuit generates a corresponding "best phase" data sample select signal 148a–h, each of the eight values in signal 148a–h corresponding to a respective data sample 45a–h, wherein only one of the respective values 148a–h is high at any given time—i.e., the value corresponding to the "optimal" clock phase signal 43a–h mapped to the respective best phase data sample 45a–h. In other words, the selection of the optimal clock phase is based on its corresponding data sample being farthest from a detected edge in the respective bit period.

Under conditions of significant received-phase noise, more than one peak in relative quality may be detected in each bit period. Thus, in a presently preferred embodiment, in order to reduce logic complexity, the digital logic circuit 144 makes arbitrary decisions in unusual cases, ie., where there is most likely too much noise to receive a good signal even with an optimally sampled data phase choice. In particular, the logic circuit 144 always selects exactly one best sample data phase, set to high in signal 148a–h. When two peaks are detected in any given sample N (i.e., from signal 142a–h) and in a later sample N+2, sample N is considered better if the (N+1)th bit equals zero. Similarly, when two peaks are detected at sample N and at sample N+3, sample N is considered better if the (N+2)th bit equals zero. But when two peaks are detected at sample N and at sample N+4, which indicates a very poor received signal, the earlier received data sample is arbitrarily treated as the best. In the event that no peaks are detected, i.e., if the eight bits 142a–h are 00000000, or 11111111, the data sample select signal 148d is arbitrarily set to high.

The data sample select signal 148a–h is input into a selector of a selective output mux 154, which also receives on a delayed basis, the synchronized data samples 45a–h for each bit period, as described in further detail below. The output mux 154 thereby outputs a respective one of the data samples 45a–h for each bit period which corresponds to the selected optimal clock phase signal 43a–h, as determined from circuits 132, 134, 140 and 144, respectively, thus generating an "optimally phased" recovered data signal 33' from the received input data signal 33. The optimally phased data signal 33' is preferably resynchronized to the reference clock 31, e.g., by way of a further synchronizing flip-flop (not shown).

Notably, when the above-described phase-tracking algorithm wraps around from the last data sample 45h of a current bit period to the first data sample 45a of an ensuing bit period, data samples from the ensuing bit time must be used. Similarly, when the phase-tracking algorithm wraps around from the first data sample 45a of a current bit period to the last data sample 45h of a previous bit period, data samples from the previous bit time must be used. To enable tracking of phase shifts of up to plus or minus two bit periods, five bit periods of data samples 45a–h are stored in a plurality of variable delay data registers 152. At the beginning of each incoming data packet, as indicated by an enable signal 146, the data samples 45a–h from the middle (i.e., third) register are used to generate the optimally phased data signal 33', but as the optimal phase is tracked during reception of the respective data packet, the stored data samples from the second or fourth registers may be used.

In a presently preferred embodiment, the digital phase acquisition circuit 46 selects the optimal sampled data phase at the beginning of each incoming data packet after a short overhead sequence containing four data transitions. Subsequently, a programmable phase-tracking circuit (not shown) may be used to track gradual phase changes in the received data signal 33 during reception of the data packet. Merely selecting the data phase with the best relative quality at each bit time could cause the data phase to jump to the next or previous bit time, causing the loss or repetition of a bit. In particular, once the phase tracking is enabled, movement in the best sampled data clock phase is restricted to the ensuing or previous clock phase, if the relative-quality state machine counters 140a–h indicate that the next or previous data phase is a better-choice data phase). Thus, by employing the relative-quality state machine counters 140a–h, and with the limitation of moving only one data phase position per bit period—i.e., one-eighth of one bit time per bit period—enough integration is provided so that phase noise is highly unlikely to result in a lost or repeated bit.

To this end, in a presently preferred embodiment, at the start of an incoming packet, signal 146 is a digital one and the logic circuit selects the best phase value in signal 148a–h in the manner described above (i.e., as determined from the most significant bits 142a–h output from the relative-quality counter state machine 140). However, when the start of packet signal 146 returns to zero, the logic circuit 144 selects the best phase value from the output of the above-described phase-tracking and bit-tracking algorithm.

In a presently preferred embodiment, ten previous bit periods worth of data samples 45a–h are stored in a plurality of fixed delay registers 150, so that the digital phase acquisition circuit 46 can determine the optimal clock phase signal based on the latest received data and then output the best data samples for the previously stored bit periods. The same bits used to determine the best phase data sample at the start of a data packet can thereby be re-used for other purposes, such as, e.g., establishing the starting bit of the data packet to synchronize a serial-to-parallel converter. Thus, in a presently preferred embodiment, an overhead bit pattern of 010110 is used in the preamble of each incoming data packet to establish both the best sampled data phase (i.e., in signal 148a–h) and the start of an incoming packet position via the two adjacent 1's.

In particular, the sampled data phases 45a–h are stored for ten bit periods to allow all four edges of the overhead pattern to propagate through the clock recovery circuit 38. Once the best-phase determination is accomplished, which takes no more than five bit periods inserted at the beginning of each data packet in a presently preferred embodiment, the best phase data samples from the stored ten bit periods earlier are output to start signal 33', thereby presenting the last five recovered bits of the overhead pattern to the start of packet detection circuitry (not shown), which looks for the first two 1's in a row in the same bits that were used for phase acquisition. This reduces overhead per packet.

As will be apparent from the present disclosure to those skilled in the art, the digital phase acquisition circuit 46 can select the "best phase" data sample 45a–h given only two noiseless edges in the received data. The need for only two edges is due to the limited (i.e., two-bit) size of the counters 140a–h. In particular, even if each counter 140a–h is saturated at plus two or minus two, from edges detected over only two consecutive bit periods, three of the counters will be incremented twice and three will be decremented twice, respectively, with the most significant bit of each counter no longer depending on its previous state, but instead depending only on the position of the last two received edges. Further, if four edges are used, one edge may be misplaced due to noise yet still not affect the outcome. This performance compares favorably to that of conventional analog phase-locked loops, which typically require hundreds of edges to accurately acquire phase. And even typical digital phase-locked loops require at least four noiseless rising edges, or eight data bit periods, to slew to a new phase. More often, eight rising edges, or sixteen data bit periods, are necessary due to the possibility of getting stuck 180 degrees out of phase for a few bit periods.

In order to further provide a more detailed description of a presently preferred embodiment of the above-described clock recovery circuit 38, the following verilog modules of an exemplary digital phase acquisition (i.e., "clock recovery") circuit 46, digital delay locked-loop 42, first and second delay circuits 70a and 70b, and received data sampler circuit 44, respectively, are as follows:

While preferred embodiments and applications of this invention have been shown and described, as would be apparent to those skilled in the art, many more modifications and applications are possible without departing from the inventive concepts herein.

The scope of the disclosed invention, therefore, is not to be restricted except in the spirit of the appended claims.

What is claimed is:

1. A digital clock recovery circuit, comprising:

a plurality of successively connected adjustable delay circuits, each delay circuit comprising a plurality of successively connected internal buffer elements and a selective output mux configured to receive, at successive inputs, output signals displaced in time from each of the respective internal buffer elements, the mux further configured to output a selected time displaced signal in response to a received mux selector control signal, wherein a first delay circuit is configured to receive as an input a reference clock, and the remaining delay circuits of the plurality are each configured to receive as an input a respective output signal from an immediately preceding delay circuit, the plurality of delay circuits thereby generating a corresponding plurality of clock phase signals approximately equally spaced in time over one reference clock cycle;

a data sampler circuit configured to receive the plurality of clock phase signals and an incoming digital data signal, and having means for generating a plurality of data samples therefrom on a bit period-by-bit period basis, the bit period corresponding to a reference clock cycle;

a digital phase acquisition circuit configured to receive the plurality of incoming data samples for each bit period, and having means for generating therefrom an optimally phased data signal;

means for comparing the transmission time of a clock signal transmitted through the respective plurality of delay circuits with a reference clock cycle and generating a responsive phase comparison output signal; and a counter configured to receive the phase comparison ouput signal and to output a cumulative counter value, wherein the counter value is periodically incremented or decremented depending upon whether the clock signal transmission time is less than or greater than the reference clock cycle.

2. The clock recovery circuit of claim 1, wherein the counter is incremented or decremented, respectively, at the end of a periodic training interval.

3. The clock recovery circuit of claim 1, further comprising a decoder configured to receive the counter output value and to generate a corresponding plurality of mux selector control values to thereby control the transmission time through each of the respective plurality of delay circuits, wherein the decoder is controlled by a truth table having a plurality of respective delay circuit mux selector control values corresponding to a plurality of possible counter values.

4. The clock recovery circuit of claim 3, wherein the respective delay circuit mux selector control values set forth in the truth table are selected such that the total transmission time through the plurality of delay circuits is substantially uniformly distributed over the individual delay circuits.

5. The clock recovery circuit of claim 1, wherein every other one of the successively connected delay circuits further comprises respective input and output signal inverters.

6. The clock recovery circuit of claim 1, wherein the means for generating a plurality of data samples comprise
   sampling circuitry configured to sample the incoming data signal at the rising edge of the respective clock phase signals, and
   synchronizing circuitry configured to re-synchronize the respective data samples to the reference clock.

7. The clock recovery circuit of claim 6, wherein the sampling circuitry comprises a first plurality of digital flip-flops, and wherein the synchronizing circuitry comprises a second plurality of digital flip-flops.

8. The clock recovery circuit of claim 1, wherein the digital phase acquisition circuit comprises an edge detector circuit configured to receive phased data samples of the incoming data signal, and having means for detecting an edge between respective pairs of neighboring data samples, wherein the edge detector circuit generates corresponding received edge signals associated with each respective incoming bit period, the received edge signal containing the respective locations of detected edges between respective adjacent pairs of phased data samples.

9. The clock recovery circuit of claim 8, wherein the digital phase acquisition circuit further comprises means for selecting a relative highest quality data sample for each bit period based upon its sampling time being furthest from a detected edge transition.

10. The clock recovery circuit of claim 9, wherein the digital phase acquisition circuit further comprises means for generating an optimal data sample phase based on the relative quality of adjacent data samples for each bit period integrated over time.

11. The clock recovery circuit of claim 10, wherein the means for generating an optimal data sample phase comprises logic circuitry configured to receive as an input the received edge signals, and having means for incrementing or decrementing respective values of a plurality of state machine counters in response to information contained in the received edge signals.

12. The clock recovery circuit of claim 10, wherein the optimal data sample phase is used to generate the recovered data signal.

13. The clock recovery circuit of claim 10, further comprising means for preventing abrupt shifts in the generated optimal data sample phase.

14. The clock recovery circuit of claim 1, wherein the plurality of delay circuits, data sampler circuit, and digital phase acquisition circuit are all part of a single integrated circuit.

15. A digital clock recovery circuit, comprising:
a digital delay-locked loop having a plurality of successively connected adjustable delay circuits, wherein a first delay circuit of the plurality is configured to receive as an input a reference clock, and wherein the remaining delay circuits of the plurality are each configured to receive as an input a respective output signal from an immediately preceding delay circuit, the plurality of delay circuits generating a corresponding plurality of respective clock phase signals approximately equally spaced in time over one reference clock cycle;

a data sampler circuit including sampling circuitry configured to sample the incoming data signal at the rising edge of the respective clock phase signals, and further including synchronizing circuitry configured to re-synchronize the respective data samples to the reference clock on a bit period-by-bit period basis; and a digital phase acquisition circuit configured to receive the plurality of incoming data samples for each bit period, and having means for generating therefrom an optimally phased data signal.

16. The clock recovery circuit of claim 15, wherein each delay circuit comprises a plurality of successively connected internal buffer elements and a selective output mux configured to receive, at successive inputs, output signals displaced in time from each of the respective internal buffer elements, the mux further configured to output a selected time displaced signal in response to a received mux selector control signal.

17. The clock recovery circuit of claim 16, wherein every other one of the successively connected delay circuits further comprises respective input and output signal inverters.

18. The clock recovery circuit of claim 16, further comprising
means for comparing the transmission time of a clock signal transmitted through the respective plurality of delay circuits with a reference clock cycle and generating a responsive phase comparison output signal,
a counter configured to receive the phase comparison output signal and to output a cumulative counter value, wherein the counter value is periodically incremented or decremented depending upon whether the clock signal transmission time is less than or greater than, respectively, the reference clock cycle.

19. The clock recovery circuit of claim 18, wherein the counter is incremented or decremented, respectively, at the end of a periodic training interval.

20. The clock recovery circuit of claim 18, further comprising a decoder configured to receive the counter output value and to generate a corresponding plurality of mux selector control values to thereby control the transmission time through each of the respective plurality of delay circuits, wherein the decoder is controlled by a truth table having a plurality of respective delay circuit mux selector control values corresponding to a plurality of possible counter values, the respective delay circuit mux selector control values selected such that the total transmission time through the plurality of delay circuits is substantially uniformly distributed over the individual delay circuits.

21. The clock recovery circuit of claim 15, wherein the means for generating an optimally phased data signal comprise
an edge detector circuit that receives the plurality of data samples for each bit period and generates a corresponding plurality of received-edge signals,
logic circuitry configured to receive as an input the received edge signals, and having means for generating a corresponding plurality of relative quality values corresponding to the data samples for each bit period, wherein the respective relative quality values are integrated over time by a plurality of counters.

22. The clock recovery circuit of claim 21, wherein the plurality of relative quality values for each bit period are determined by the relative distance in time of each data sample phase from a detected edge transition.

23. A digital clock recovery circuit, comprising:
- a digital delay-locked loop having a plurality of successively connected adjustable delay circuits that generate a corresponding plurality of clock phase signals from a reference clock, each delay circuit comprising a plurality of successively connected internal buffer elements and a selective output mux configured to receive, at successive inputs, output signals displaced in time from each of the respective internal buffer elements, the mux further configured to output a selected time displaced signal in response to a received mux selector control signal;
- a data sampler circuit including sampling circuitry configured to sample the incoming data signal at the rising edge of the respective clock phase signals, and further including synchronizing circuitry configured to re-synchronize the respective data samples to the reference clock on a bit period-by-bit period basis; and
- a digital phase acquisition circuit configured to receive the plurality of incoming data samples for each bit period, the digital phase acquisition circuit comprising
  - an edge detector circuit that generates a plurality of received-edge signals corresponding to the data samples for each bit period, and further comprising logic circuitry configured to receive as an input the received edge signals, and
  - means for generating a corresponding plurality of relative quality values corresponding to the data samples for each bit period, wherein the relative quality values for each bit period are determined by the relative distance in time of each data sample phase from a detected edge transition.

24. The clock recovery circuit of claim 23, wherein every other one of the successively connected delay circuits further comprises respective input and output signal inverters.

* * * * *